United States Patent [19]

Le Bras et al.

[11] Patent Number: 4,580,589

[45] Date of Patent: Apr. 8, 1986

[54] SAFETY DEVICE WITH BURSTING KNIFE AND DIAPHRAGM FOR LIMITING THE PRESSURE OF A FLUID

[75] Inventors: Jean Le Bras, Montereau; Joseph Nedelec, Voulx, both of France

[73] Assignee: Electricite de France Service National, Paris, France

[21] Appl. No.: 597,265

[22] Filed: Apr. 6, 1984

[30] Foreign Application Priority Data

Apr. 14, 1983 [FR] France .................. 83 06111

[51] Int. Cl.⁴ ............................................. F16K 17/40
[52] U.S. Cl. .................................................. 137/68.1
[58] Field of Search ........................... 137/68 R, 797

[56] References Cited

U.S. PATENT DOCUMENTS 1,671,369  5/1928  Johan .
3,872,874  3/1975  Nedelec et al. ............... 137/68 R
3,989,057  11/1976  Muddiman .................... 137/68 R
4,464,936  8/1984  McIntire et al. ................ 73/705

FOREIGN PATENT DOCUMENTS 1292002  3/1962  France .
 501233  10/1976  U.S.S.R. ...................... 137/68 R
 932061  5/1982  U.S.S.R. ...................... 137/797

Primary Examiner—Stewart J. Levy
Assistant Examiner—Joseph W. Roskos

[57] ABSTRACT

Safety device for limiting the pressure of a fluid, having at least one hollow modular member, which is open at both ends, a diaphragm closing one end, and a knife mounted within the modular member facing the diaphragm at a regulatable distance from it. The device also has a piston for making the knife strike the diaphragm in order to bring about bursting before this would be done by deformation of the diaphragm under the effect of a given pressure. The knife may have a pointed central lip bordered by two leading lips so as to reliably bring about bursting of the diaphragm.

10 Claims, 3 Drawing Figures

SAFETY DEVICE WITH BURSTING KNIFE AND DIAPHRAGM FOR LIMITING THE PRESSURE OF A FLUID

BACKGROUND OF THE INVENTION

The present invention relates to a safety device with bursting knife and diaphragm for limiting the pressure of a fluid. It particularly applies to the protection of installations containing a pressurized fluid (i.e. a liquid or gas) and more specifically the protection of steam generators of sodium-cooled, fast neutron nuclear reactors. It makes it possible to protect such steam generators against the effects of accidental overpressure resulting from a sodium-water reaction and to discharge the products of said reaction.

A safety device with a bursting knife and diaphragm for limiting the pressure of a fluid is known from U.S. Pat. No. 3,872,874.

In this device, the knife is fixed and the diaphragm can only burst after being adequately deformed in the direction of the knife, when the pressure reaches the so-called bursting pressure and which is defined by a presetting of the distance between the knife and the diaphragm. Thus, the operation of this device can only be passive, i.e. it is completely dependent on the development of the pressure level as a function of time in the protected installation.

Such an operation which is only passive is disadvantageous because, for operating reasons (such as the removal of products from the sodium-water reaction in the example given hereinbefore in order to minimize caustic corrosion phenomena) or for reasons of the protection of structures, it may be advantageous to anticipate the bursting of the disk, i.e. to make it burst before the bursting pressure is reached.

SUMMARY OF THE INVENTION

The present invention relates to a safety device with bursting knife and diaphragm not suffering from the disadvantage of the known device, particularly with respect to its operation which can be active as well as passive.

More specifically the present invention relates to a safety device for limiting the pressure of a fluid to a predetermined value, said device having at least one hollow modular member, which is open at its two ends, as well as for each modular member sealing means mounted on said ends, a preshaped diaphragm having a convex face and a concave face and mounted as a tight cover for one of the ends, the convex face of the diaphragm being oriented towards the inside of the modular member, and a knife mounted within the modular member facing the convex face of the diaphragm and at an adjustable distance from said convex face, in such a way that a predetermined pressure exerted by the fluid on the concave face of the diaphragm brings the latter into contact with the knife, which then brings about its bursting, wherein, for each modular member, there are also means for making the knife strike the diaphragm, so as to bring about the bursting of the latter when the concave face thereof is exposed to a pressure below said predetermined pressure from the fluid.

Thus, the device according to the invention effectively has an operation which can be active or passive, depending on the way the means for making the knife strike the diaphragm are made to act.

Obviously the device according to the invention can, as required, have one or more modular elements arranged in series on the installation to be protected.

According to a special feature of the device according to the invention, the means for making the knife strike the diaphragm have a part which can move and the knife is joined to said part and has a position which can be regulated with respect to the latter.

For example, pneumatic means are used as the means for making the knife strike the diaphragm. According to a special embodiment of the invention, the means for making the knife strike the diaphragm comprise a chamber mounted within the modular member facing the convex face of the diaphragm, means for supplying gas to the chamber for the pressurization thereof, a piston which, on the one hand carries the knife having a regulatable position relative to the piston, and which on the other hand slides in the chamber during the pressurization thereof in the direction of the convex face of the diaphragm and mechanical means provided for fixing the piston in the chamber and for retracting under the action of a displacement of the piston during the pressurization of the chamber.

Preferably, the knife is locked in rotation with respect to the piston and the piston is locked in rotation with respect to the chamber. This makes it possible for the knife to strike the diaphragm at a precise point thereon.

According to a preferred embodiment of the invention, the knife has a central lip which is pointed and is bordered by two leading lips so as to be able to pierce the diaphragm and then shear the latter.

According to a preferred feature of the invention, the tip of the knife can move in a given direction under the action of said means in order to make the knife strike the diaphragm, the leading lips being defined on one side, respectively by planar clearance faces forming an acute angle exceeding 5° with said given direction, and on the other side by a same planar face forming with said given direction a clearance angle smaller than the acute angle and at the most equal to 5°. The clearance angle is, for example, equal to 2°.

Such a knife is very reliable, i.e. it reliably brings about the bursting of the diaphragm when it strikes the latter (active operation of the device according to the invention), or when said diaphragm deforms until it reaches the knife (passive operation of the device according to the invention), which is not the case with the knife described in French Pat. No. 2 192 719, which is able to pierce the diaphragm, but does not systematically burst the latter.

Preferably, the diaphragm is shaped like a spherical cap and the means for making the knife strike the diaphragm are such that, under the action thereof, the tip of the knife moves along the axis of symmetry of the spherical cap so as to strike the apex of the diaphragm.

Finally, according to another special feature of the device according to the invention, the knife is placed in a chemically inert gaseous medium.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
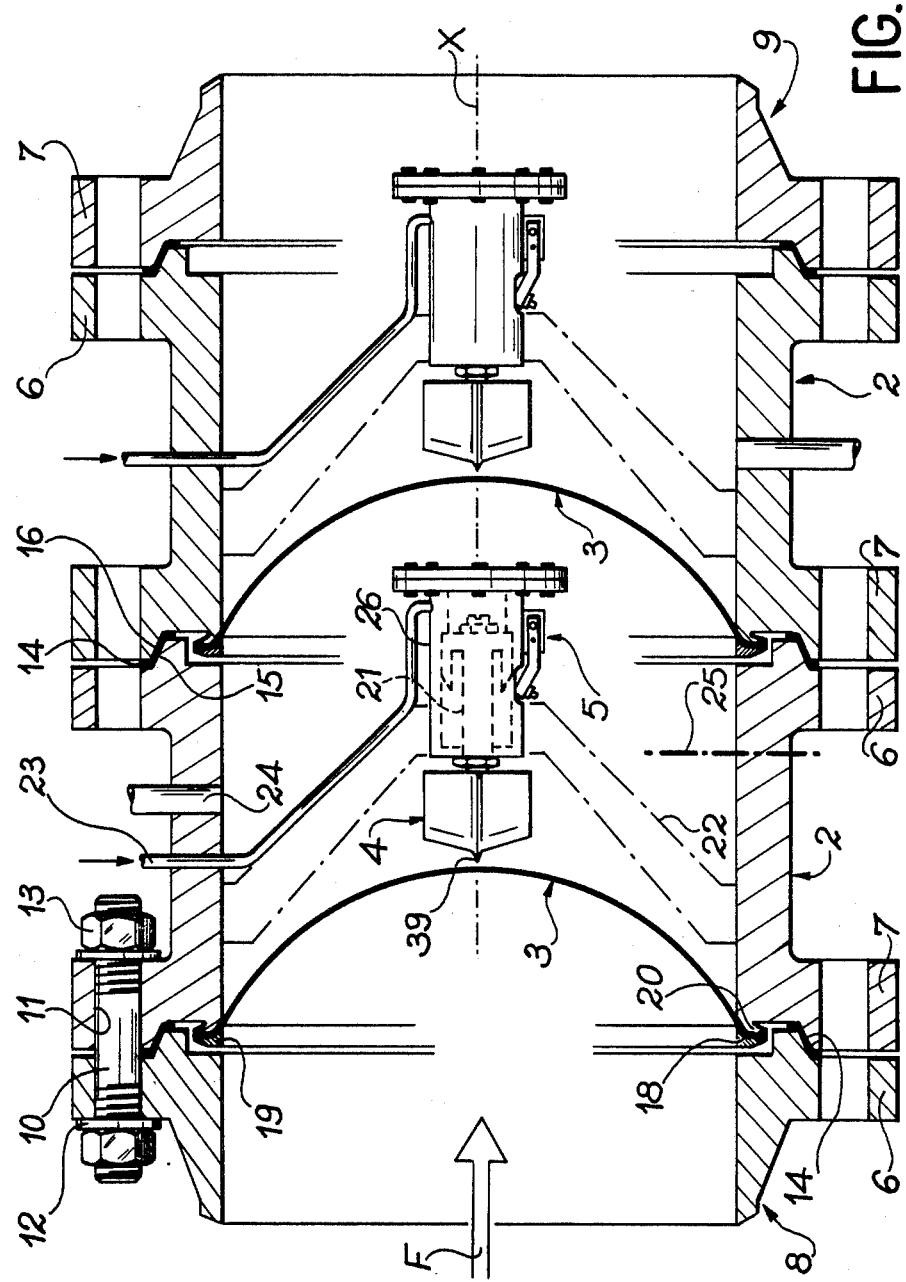
FIG. 1 a diagrammatic view of a special embodiment of the device according to the invention with a bursting knife and disk.

FIG. 1 diagrammatically shows a special embodiment of the device according to the invention. It essentially comprises at least one modular member 2 and, for each modular member a diaphragm 3, a knife 4 and means 5 for making the knife 4 strike diaphragm 3.

Each modular member 2 is in the form of a hollow body, e.g. a cylindrical body having open ends and respectively terminated by male flange 6 and female flange 7 provided for the connection of a modular member 2 to another modular member or to a pipe 8 or 9 terminated by a flange which is complementary to that of the modular member to which it is to be connected. For example, there are two modular members 2 connected in series, one being connected to a pipe 8 of the installation to be protected, the other being e.g. connected to a discharge pipe 9. Assembly means are provided between the male and female flanges and consist e.g. of bolts 10 passing through holes 11 made in the flanges, safety washers 12 and retaining nuts 13. Sealing means 14, e.g. constituted by joints of type S, are mounted at the ends of the modular members 2, in such a way that each joint is positioned between the junction planes 15, 16 of adjacent male and female flanges 6 and 7 respectively, in order to bring about a conventional seal with respect to the outside.

The diaphragm 3 of a modular member 2 is in the form of a spherical cap and has on its periphery a pheripheral collar 18 connected to said spherical cap. Diaphragm 3 is made from metal or any other appropriate material. For example, it is obtained by hydraulic pressing from a 0.3 mm thick stainless steel blank.

Diaphragm 3 has advantages compared with other known diaphragms. Unlike in the case of the latter, which are limited in operation to a single pressure value (bursting pressure obtained by calibrated notches in a sheet or by the axial compression of a reverse-type diaphragm), the diaphragm 3, for a given thickness and base diameter, can cover a complete range of bursting pressures on the basis of different settings of the knife. This parameter, as well as the homothetic transformation existing between devices of different diameters (geometry, behaviour) tends to reduce costs (so that the research expenditure is reduced, development is fast, etc.). Moreover, the design codes can take into account the behaviour of the particular diaphragm, as a function of the development of the mechanical or metallurgical characteristics linked with the stresses (pressure, temperature), if, after pressing, the diaphram 3 undergoes a heat treatment at 1100° C., which completely relaxes the material from which it is made. This provides better information on the service life of a diaphragm, which is defined by the time and stressing conditions for which the mechanical characteristics are sufficiently stable to not reduce the predetermined bursting pressure value.

Each diaphragm 3, which, as a result of its shape, has a concave face and a convex face, is mounted as a tight cover for whichever of the ends of the corresponding modular member 2 faces pipe 8, the convex face of the diaphragm being oriented towards the inside of member 2, in such a way that the pressure of the fluid present in pipe 8 which is symbolized by the arrow F in FIG. 1, is exerted on the concave face of diaphragm 3 directly facing pipe 8 (and will be exerted on the concave face of the other diaphragm if the previous diaphragm has burst).

Each diaphragm 3 is associated with an e.g. metallic reinforcing ring 19 and is mounted in such a way that the corresponding peripheral collar 18 is engaged between said ring and a shoulder 20 of the flange of the end at which diaphragm 3 is located. The peripheral collar, ring and shoulder are assembled by a lipped weld, which provides the seal between the upstream area and the downstream area with respect to the diaphragm. Ring 19 is designed so as to perfectly adapt to the connection between the hemispherical cap and the peripheral collar. This ring makes it possible to strengthen the connection in such a way that the corresponding diaphragm can withstand the stresses induced, and is not turned over during the placing of pipe 8 under a vacuum or the rapid emptying of the protected installation, said emptying operation causing a siphoning effect.

The means 5 for making knife 4 strike diaphragm 3 are pneumatic means having a cylindrical hollow part 26 of axis Y (FIG. 2) in which a piston 21 can slide along axis Y. Knife 4 has a threaded rod 17, extended by a cutting part 35 terminated by a tip 39 (FIGS. 2 and 3), the threaded rod 39 being fixed to piston 21 in such a way that the axis Z of the rod coincides with the axis Y of the hollow part 26. The pneumatic means 5 are mounted within the corresponding modular member 2 facing the convex face of the diaphragm, on supports 22 fixed to the inner wall of member 2 and in such a way that the displacement direction of piston 21 is parallel to the axis of symmetry X of the spherical cap constituting diaphragm 3 (axes X and Y consequently being parallel). Tip 39 of knife 4 moves along said axis of symmetry X (and in the direction of the diaphragm) when pneumatic means 5 are put into operation. This enables the tip 39 to strike the apex of diaphragm 3, i.e. at the intersection of the diaphragm and its axis of symmetry. It should be noted that the cylindrical modular members 2, which are identical and arranged in series, have the same axis of symmetry, which coincides with the axis of symmetry X of the diaphragms).

The pneumatic means 5 are supplied with a pressurized gas by a duct 23, which enters the corresponding modular member by a not shown tight passage. The modular member is also provided with an opening 24, through which it is possible to inject a chemically inert gas, such as argon or nitrogen into the space housing knife 4 (said gas obviously being at a pressure well below that which is exerted on the concave face of the diaphragm). Finally, an electrode 25, diagrammatically indicated by a mixed line and serving to detect the presence of the fluid such as liquid sodium, downstream of diaphragm 3, i.e. in the space housing knife 4, traverses modular member 3 by an electrically insulated, tight passage (not shown).

Figure 2:
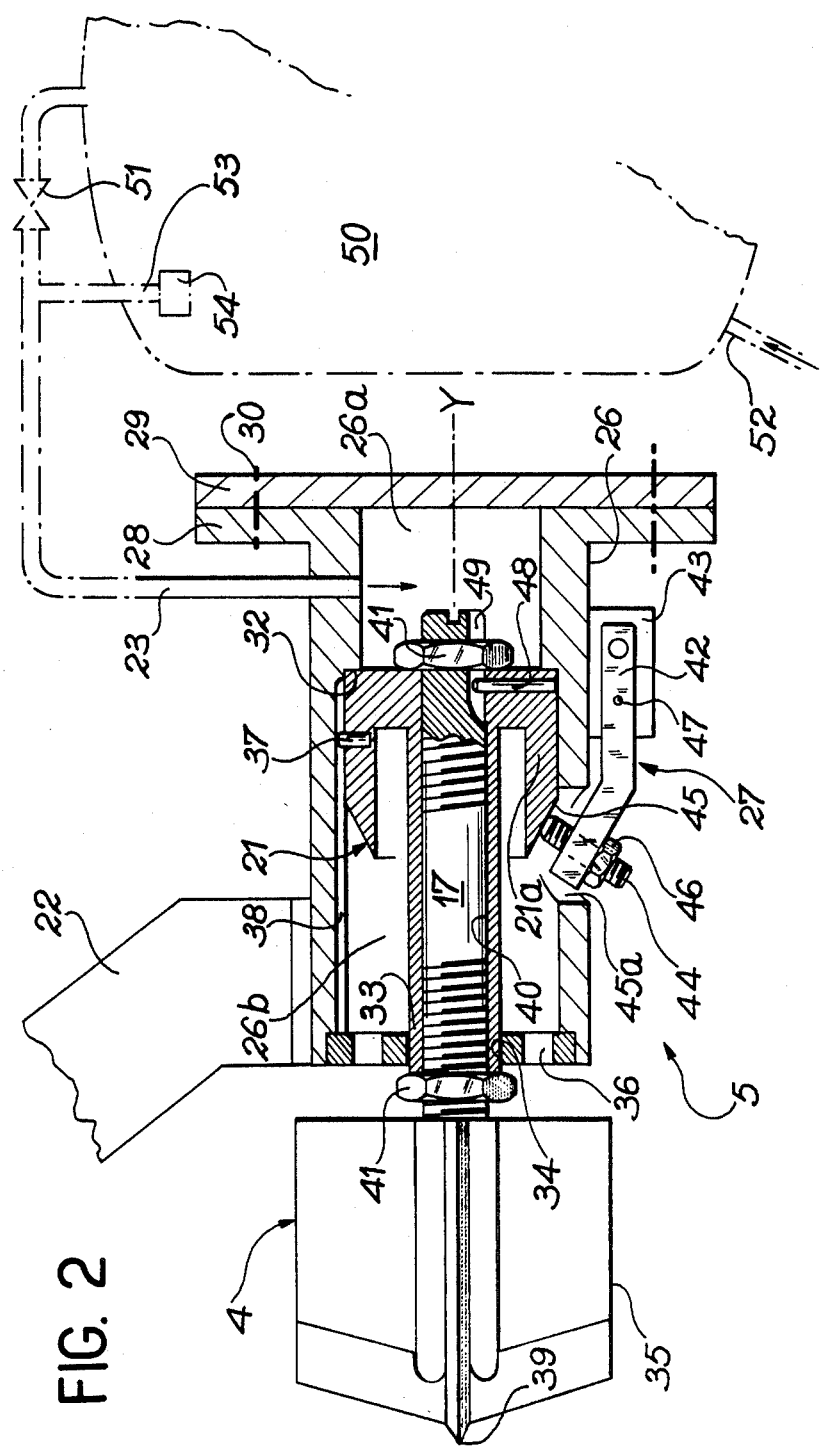
FIG. 2 a diagrammatic view of a special embodiment of the means for making the knife strike the diaphragm.

FIG. 2 diagrammatically shows a special embodiment of the pneumatic means 5 enabling the knife 4 to strike against the diaphragm 3. These pneumatic means 5 essentially comprise the cylindrical hollow member 26 of axis Y forming a compression chamber, means for supplying gas to said chamber constituted by duct 23, piston 21 for sliding in the compression chamber along axis Y and mechanical means 27 for immobilizing the piston in the chamber and which are retracted under the effect of a displacement of said piston.

The end of the hollow member 26 furthest away from the diaphragm is open and has a flange 28. It can be closed by means of a plate 29 having a flange which can be assembled to flange 28 by bolts 30, diagrammatically represented by mixed lines. The interior of hollow member 26 has a first cylindrical portion 26a, into which issues duct 23 and a second cylindrical portion 26b having a larger diameter and of the same axis Y as the first, which is closer to the diaphragm than the latter and in which piston 21 slides. Due to the diameter difference, the two portions are defined by a circular shoulder 32, against which piston 21 can abut. Piston 21 has a main body 21a, extended by a rod 33 which is also of axis Y and which slides in a calibrated opening 34 made in the end of hollow member 26 closest to the diaphragm, said end being a joined part (for the fitting of the piston) and which also has holes 36 ensuring that the displacement of the piston is not disturbed by the gas which can be located in said second portion 26b. Moreover, any rotation of piston 21 relative to hollow member 26 is prevented by means of a key 37 fixed to the periphery of the main body 21a of piston 21 and engaged in a groove 38 parallel to axis Y, on the inner wall defining the second portion 26b of the interior of hollow member 26.

The threaded rod 17 of knife 4 passes into a calibrated hole 40 of axis Y, which traverses the main body 21a and rod 33 of piston 21 to which it is fixed by two nuts 41 screwed on to the threaded rod 17, on either side of piston 21 and against the latter, said two nuts also making it possible to regulate the position of knife 4 relative to piston 21 and consequently relative to diaphragm 3.

Main body 21a of piston 21 is kept against shoulder 32 by mechanical means 27 incorporating a lever 42, whereof one end is articulated in rotation with an axis perpendicular to axis Y, to a support 43 fixed to the hollow member 26 outside the latter, said rotation being prevented by a pin 47 passing through lever 42 and engaging in support 43, and whereof the other end has a threaded hole traversed by a screw 44, whereof one side bears on a sloping face 45 of main body 21a of piston 21, whilst passing through a hole 45a made in body 21a and on the other side carries a lock nut 46. The displacement of screw 44 relative to lever 42 makes it possible to adjust the positon of piston 21 in hollow member 26.

Any rotation of knife 4 relative to piston 21 is prevented by another key 48 fixed to the latter and engaged in another groove 49 made on the periphery of threaded rod 17 of knife 4 parallel to axis Y.

The duct 23 connects the first portion 26a of the interior of hollow member 26 to a reservoir 50 containing a chemically inert gas, such as pressurized nitrogen or argon. This gas can be passed into said first portion 26a by opening an electrovalve 51 mounted on duct 23.

FIG. 2 also shows a pipe 52 for filling the reservoir 50 with gas, as well as another pipe 53, whereof one end issues into duct 23, between electrovalve 51 and hollow member 26, and whose other end issues into reservoir 50. This other end is closed by a cap 54, which can be destroyed by a not shown pyrotechnic device, in order to pass the gas into the first portion 26a, instead of using electrovalve 51 for this purpose.

Figure 3:
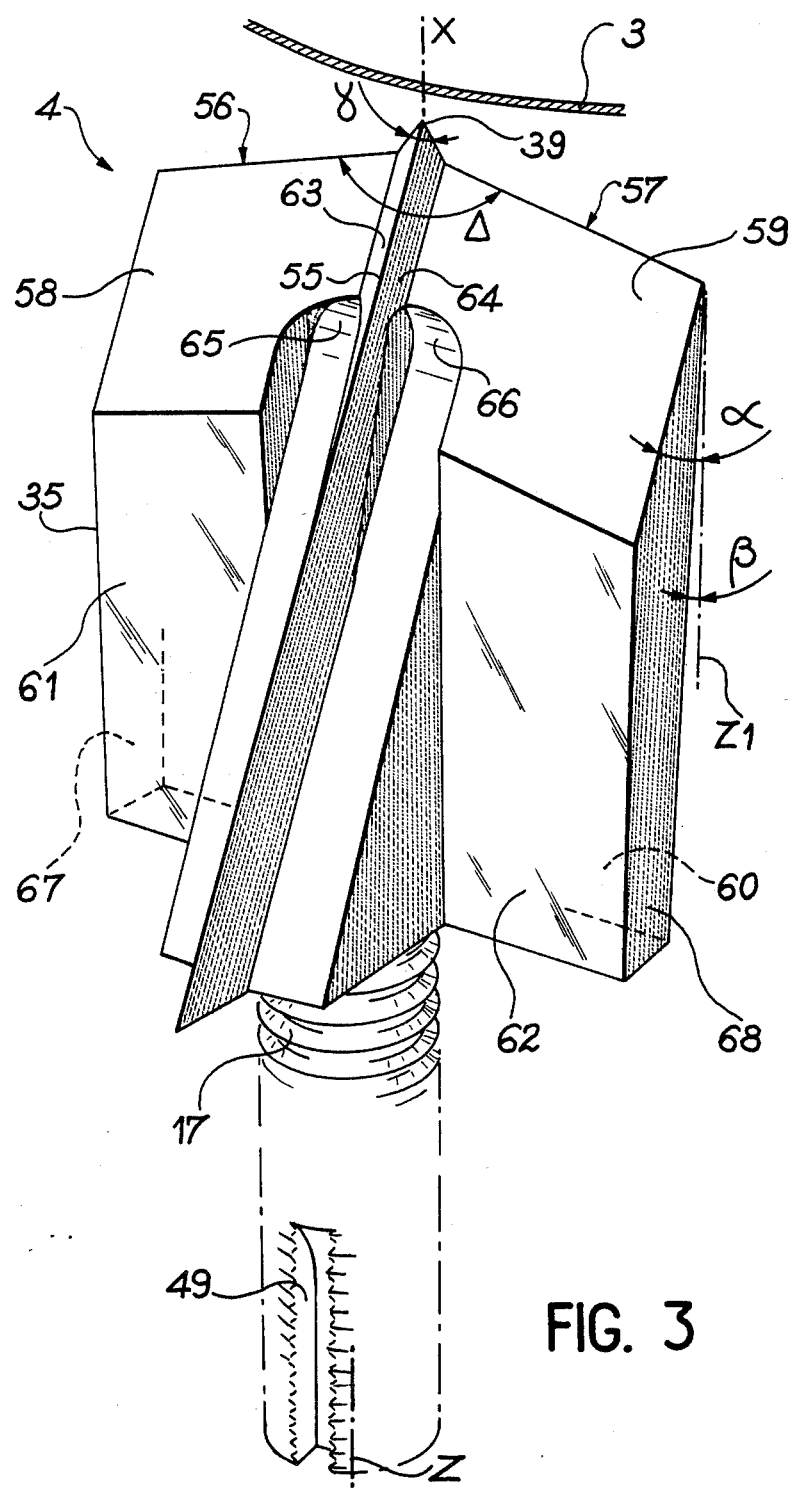
FIG. 3 a diagrammatic view of a preferred embodiment of the knife.

FIG. 3 diagrammatically shows a preferred embodiment of knife 4. It comprises the cutting part 35 rigidly connected to the threaded rod 17 of axis Z, the latter being parallel to the axis of symmetry X of diaphragm 3 and coincides with axis Y of hollow member 26, when knife 4 is mounted on piston 21 (FIG. 2). Cutting part 35 (FIG. 3) has a central cutting lip 55, which is terminated by a point or tip 39 and is bordered by two leading cutting lips 56, 57, which are symmetrical to one another with respect to the central lip 55. The leading lips 56, 57 are defined on one side respectively by the planar clearance faces 58, 59 parallel to the edge of central lip 55 forming an acute angle with the axis Z of threaded rod 17, and on the other side by a same planar face 60 forming a clearance angle, which is much smaller than the acute angle, with axis Z of threaded rod 17. The clearance faces 58, 59 are extended in the direction of the threaded rod, respectively by two planar faces 61, 62 parallel to axis Z of the threaded rod 17. The central lip 55 is defined by two elongated planar faces 63, 64, which form an acute angle and dominate the planar clearance faces, whilst being extended in the direction of threaded rod 17. Moreover, the two faces 63, 64 are limited on the side of the leading lips, by the plane containing planar face 60, so as to form tip 39 terminating the central lip 55.

For information and without limitation, the acute angle α between the clearance faces 58, 59 (or the edge of central lip 55) and the axis Z of threaded rod 17 is approximately 30°, the clearance angle β between the same planar face 60 and axis Z is approximately 2°, the angle γ formed by faces 63, 64 defining the central lip 55 is approximately 20° and the edges of the leading lips (constituted by the intersection of said clearance faces 58, 59 with the planar face 60) formed between them an angle Δ of approximately 156°, which obviously implies a slight reciprocal inclination of clearance faces 58, 59. In FIG. 3, angles α and β are marked relative to an axis Z1 parallel to axis Z. Finally, the cutting part 35 is limited parallel to axis Z by two parallel planes 67, 68.

FIG. 3 also shows areas 65, 66, which are undercut portions corresponding to the clearances or disengagements of a tool used for forming the knife.

The passive operation of the device according to the invention is as follows (FIG. 2). With plate 30 removed, the distance between the diaphragm and the knife is regulated by the two nuts 41. For this purpose, the nut closest to the diaphragm is screwed up and the other is unscrewed, or vice versa, depending on whether it is wished to move the knife towards or away from the diaphragm. Piston 21 is kept in engagement against shoulder 32 by means of screw 44 which bears on the latter, pin 47 being engaged in the manner shown hereinbefore. When the setting has been completed, plate 30 is refitted and its flange is assembled with that 28 of hollow member 26. Obviously this is carried out for each diaphragm-knife assembly of the device according to the invention and prior to the installation of the corresponding modular member.

It is pointed out that the knife is positioned, at ambient temperature, with respect to the diaphragm at a predetermined distance by means of a deformation curve based on another identical diaphragm and specifically at the intended use temperature for the diaphragm. The stresses obtained during the deformation of the diaphragm up to the start of cracking thereof on the knife (it is obviously a diaphragm which is subject to the pressure of the fluid) are such that they bring about the propagation of said deformation and then the bursting of the diaphragm, the latter taking place at a given pressure of the fluid, which is a function of the present distance between the diaphragm and knife.

It has been stated hereinbefore that it may be of interest to anticipate the bursting of the diaphragm. This corresponds to the active operation of the device according to the invention, which is as follows. The distance between the knife and the diaphragm is set in the manner described hereinbefore, the chamber constituted by the first portion 26a (FIG. 2) of the interior of the hollow member 26 is pressurized, which is brought about by the opening of electrovalve 51 or by destroying cap 54. The force which is then exerted on piston 21 is transmitted by the latter to lever 42 and consequently to pin 47 perpendicular to the latter. When an adequate force is applied to the pin, e.g. approximately 4 daN/mm$^2$, the pin is sheared, which releases the knife-carrying piston. The knife strikes against the diaphragm and makes a notch thereon, which is adequate for bringing about the bursting of the diaphragm.

It should be noted that during such an active operation of the safety device according to the invention, the notch formed by the knife can be larger than that caused during the passive operation thereof, if the pressure in the protected installation, at the time of putting the device into operation, is lower than the said predetermined pressure (corresponding to a passive bursting).

No matter whether the device operates actively or passively, the operation of the knife is as follows (FIG. 3). When the tip 39 of the knife has pierced the diaphragm, the cutting obtained for the latter is identical to that carried out by a shear. The forward movement is produced by the deformation of the diaphragm under the action of pressure (passive operation) or the displacement of the knife during striking (active operation). For each deformation or displacement step, the cutting angle Δ makes a larger notch, whilst retaining and moving apart one side of the diaphragm material by the clearance surface constituted by the clearance faces 58, 59, whilst allowing the other side to slide along said same planar face 60.

The same knife can be used with diaphragms having very different basic diameters, provided that the leading lips have an adequate width to produce in the diaphragms the "slot" which will bring about bursting. Thus, bearing in mind the geometry of the knife, a diaphragm can burst with said notch width without impairing the bursting pressure value i.e. the knife width can significantly exceed the notch width.

What is claimed is:

1. A safety device for limiting the pressure of a fluid to a predetermined value, said device having at least one hollow modular member having two open ends, each modular member having sealing means mounted on said ends, a preshaped diaphragm having a convex face and a concave face and mounted as a tight cover for one of the ends, the convex face of the diaphragm being oriented towards the inside of the modular member, and a knife mounted within the modular member facing the convex face of the diaphragm and at an adjustable distance from said convex face, in such a way that a predetermined pressure exerted by the fluid on the concave face of the diaphragm brings the latter into contact with the knife, to thereby burst the diaphragm, and controllable means for each modular member for making the knife strike the diaphragm, so as to bring about the bursting of the diaphragm when the concave face thereof is exposed to a pressure below said predetermined pressure from the fluid.

2. A device according to claim 1, wherein the means for making the knife strike the diaphragm comprise a displaceable part, and wherein the knife is joined to said part and has a regulatable position with respect thereto.

3. A device according to claim 2, wherein the means for making the knife strike the diaphragm comprise a chamber mounted within the modular member facing the convex face of the diaphragm, means for supplying gas to the chamber for the pressurization thereof, a piston which carries the knife having a regulatable position relative to the piston, and which slides in the chamber during the pressurization thereof in the direction of the convex face of the diaphragm and mechanical means provided for fixing the piston in the chamber and for retracting under the action of a displacement of the piston during the pressurization of the chamber.

4. A device according to claim 3, comprising means for preventing relative rotation of said knife with respect to said piston, and means for preventing relative rotation of said piston with respect to said chamber.

5. A device according to claim 1, wherein the knife has a pointed central lip, which is bordered by two leading lips, so as to be able to firstly pierce the diaphragm and then shear the latter.

6. A device according to claim 5, wherein the tip of the knife is movable in a given direction under the action of said means in order to make the knife strike the diaphragm, the leading lips being defined on one side, respectively by planar clearance faces forming an acute angle exceeding 5° with said given direction, and on the other side by a same planar face forming with said given direction a clearance angle smaller than the acute angle and at the most equal to 5°.

7. A device according to claim 6, wherein the diaphragm is in the form of a spherical cap, the means for making the knife strike the diaphragm are such that under the action thereof the tip of the knife moves along the axis of symmetry of the spherical cap, so as to strike the apex of the diaphragm.

8. A device according to claim 1, wherein the knife is placed in a chemically inert gaseous medium.

9. A safety device for limiting the pressure of a fluid to a predetermined value, said device having at least one hollow modular member having two open ends, each modular member having sealing means mounted on said ends, a preshaped diaphragm having a convex face and a concave face and mounted as a tight cover for one of the ends, the convex face of the diaphragm being oriented towards the inside of the modular member, and a knife mounted within the modular member facing the convex face of the diaphragm and at an adjustable distance from said convex face, in such a way that a predetermined pressure exerted by the fluid on the concave face of the diaphragm brings the latter into contact with the knife, to thereby burst the diaphragm, and for each modular member means for making the knife strike the diaphragm, so as to burst the diaphragm when the concave face thereof is exposed to a pressure below said predetermined pressure from the fluid, said knife having a pointed central lip, which is bordered by two leading lips, so as to be able to firstly pierce the diaphragm then shear the latter, the knife having a tip movable in a given direction under the action of said means in order to make the knife strike the diaphragm, the leading lips being defined on one side, respectively by planar clearance faces forming an acute angle exceeding 5° with said given direction, and on the other side by a same planar face forming with said given direction a clearance angle smaller than the acute angle and at the most equal to 5°.

10. A device according to claim 9, wherein the diaphragm is in the form of a spherical cap, the means for making the knife strike the diaphragm are such that under the action thereof the tip of the knife moves along the axis of symmetry of the spherical cap, so as to strike the apex of the diaphragm.

* * * * *